United States Patent [19]
Wong et al.

[11] Patent Number: 5,897,502
[45] Date of Patent: Apr. 27, 1999

[54] PERSISTENCE FOR ULTRASONIC FLOW IMAGING

[75] Inventors: Tommy King-Yuen Wong, Issaquah; Zoran Banjanin, Newcastle, both of Wash.

[73] Assignee: Siemens Medical Systems, Inc., Iselin, N.J.

[21] Appl. No.: 08/757,041

[22] Filed: Nov. 26, 1996

[51] Int. Cl.$^6$ .................................................. A61B 8/06
[52] U.S. Cl. ........................................... 600/454; 600/455
[58] Field of Search ............................ 600/441, 455–458

[56] References Cited

U.S. PATENT DOCUMENTS

| | | | |
|---|---|---|---|
| 5,083,566 | 1/1992 | Baba | 600/441 |
| 5,215,094 | 6/1993 | Franklin et al. | 128/661.08 |
| 5,357,580 | 10/1994 | Forestieri et al. | 382/6 |
| 5,467,770 | 11/1995 | Smith et al. | 128/661.08 |
| 5,709,209 | 1/1998 | Friemel et al. | 600/443 |

Primary Examiner—Francis J. Jaworski

[57] ABSTRACT

An improved technique for providing persistence to velocity signals obtained by an ultrasound imaging system is disclosed. The velocity signals with appropriate persistence are then used to form an image on a display device so as to accurately depict fluid flow. The persistence technique intelligently decides whether or not to provide persistence to the velocity signals. In making these persistence determinations, the persistence technique not only avoids distorting the velocity values with corrupt signals, but also preserves directional flow information. The persistence technique can also make use of various thresholds to reduce errors (e.g., flash artifacts or random noise) as well as persistence of such errors.

19 Claims, 5 Drawing Sheets

PERSISTENCE FOR ULTRASONIC FLOW IMAGING

BACKGROUND OF THE INVENTION

1. Field of the Invention

The present invention relates to ultrasound imaging systems and, more particularly, to ultrasonic color flow imaging.

2. Description of the Related Art

Ultrasound imaging systems are known to display images associated with blood flow in a subject. Such a display mode is known as a color flow mode because different flow directions are indicated by different colors. Additionally, the velocity of the flows are indicated by degree of brightness of the colors.

Displaying blood flow on a display device is known to be problematic. In particular, with stationary or slow moving blood, it is difficult to display accurate images of blood flow that are not confusing to a clinician. With conventional ultrasound imaging systems, blood flow that is either stationary or slow moving in a particular direction often leads to measurement inaccuracies by the ultrasound imaging system that cause blood flow to appear to be moving when it is stationary or appears to be moving in an opposite direction than it is actually moving. In addition, for the portions of an image being displayed that correspond to stationary or slow moving blood, there tends to be small interspersed areas of blood flowing to the transducer as well as away from the transducer. In a two color display mode, where red is used for blood movement in one direction and blue is used for blood flowing in the opposite direction, a clinician can be confused by the resulting image displayed because red and blue pixels will often be interspersed. Consequently, the clinician may be mislead or be unable to diagnose the subject's ailment.

Attempts to overcome the problems associated accurate display of slow moving blood have been somewhat successful. Generally, the conventional approaches perform some sort of averaging of previous signals with current signals. This averaging approach smoothes out the resulting signals such that the interspersed regions of red and blue pixels are largely prevented. However, other regions not needing the smoothing are also smoothed, and thus distorted. Hence, confusion or misdiagnosis by a clinician can still occur because the high velocity signals are now distorted.

Another problem that occurs due to the averaging of the previous signal and the current signal is that unacceptably long decay times for colors being displayed may occur. As an example, very long decay times may result in data being displayed even after the probe is no longer receiving information. Such long decay times cause the resulting image to lag and often distort actual flow conditions.

Recently, averaging approaches have been enhanced to overcome some of the above-mentioned problems. In U.S. Pat. No. 5,357,580 an improved averaging solution is disclosed in which a variable weighting coefficient is used so as to heavily average image information for smaller velocities and minimally average image information for high velocities. Similarly, U.S. Pat. No. 5,467,770 discloses a filter that provides an averaging solution with persistence to ultrasound images by using filter adjustable weighting coefficients. Further, in U.S. Pat. No. 5,215,094 another similar averaging solution is disclosed. The averaging of a new value with a previous output value is performed by a persistence modulator to provide asymmetric persistence to the image displayed pertaining to fluid velocity. In particular, increases in the velocity are processed to exhibit a shorter time constant than the time constant used for decreases in velocity.

However, these recent averaging approaches still have significant shortcomings. There is no accommodation for velocity values that have rapidly changed direction. In addition, small flow detection is hampered for low flows, particularly when flow direction reverses. Further, when aliasing is present due to high flow velocities, the resulting image is typically not accurately displayed. Also, corrupt velocity values distort actual velocity values in the averaging approach.

Thus, there is a need for an improved approach to imaging velocity of fluids in an ultrasound system such that persistence processing suitably deals with rapid direction changes in flow, low velocity flows, and corrupt signals.

SUMMARY OF THE INVENTION

Broadly speaking, the invention is an improved technique for providing persistence to velocity signals obtained by an ultrasound imaging system. The velocity signals with appropriate persistence are then used to form an image on a display device so as to accurately depict fluid flow. According to the invention, the persistence technique intelligently decides whether or not to provide persistence to the velocity signals. In making these persistence determinations, the persistence technique not only avoids conventional averaging approaches that distort the velocity values, but also preserves directional flow information. The persistence technique can also make use of various thresholds to reduce errors (e.g., flash artifacts or random noise) as well as persistence of such errors.

The invention may be implemented in numerous ways, including as a method, an apparatus and a system. Several implementations are discussed below.

As a method for displaying color flow images, one embodiment of the invention includes the operations of: obtaining a current input velocity value for flow in a portion of an image to be displayed; obtaining a previous output velocity value for flow in the portion of the image to be displayed; decreasing the absolute value of the previous output velocity by a decay factor to produce a decayed previous output velocity value; determining whether the direction of flow associated with the current input velocity value is substantially opposite the direction of flow associated with the previous output velocity value; comparing the current input velocity value with the decayed previous output velocity value; and outputting the current input velocity value when one of the direction of fluid flow has changed and the current input velocity value exceeds the decayed previous output velocity value; otherwise, outputting the decayed previous output velocity value. Preferably, the portion of the image pertains to a pixel and the image to be displayed is produced by a frame of pixel values. In the cases where the decayed previous output velocity value is output as the output velocity value for the portion of the image, then the portion of the image is provided with persistence.

As a method for displaying color flow images, another embodiment of the invention includes the operations of: obtaining a current input velocity value for flow in a portion of an image to be displayed; obtaining a previous output velocity value for flow in the portion of the image to be displayed; decreasing the absolute value of the previous output velocity by a decay factor to produce a decayed previous output velocity value; determining whether the direction of flow associated with the current input velocity value is substantially opposite the direction of flow associated with the previous output velocity value; comparing the current input velocity value with the decayed previous output velocity value; comparing the magnitude of the current input velocity value with a velocity threshold value; outputting the current input velocity value when the direction of fluid flow has changed and the magnitude of the current input velocity value exceeds the velocity threshold value, or when the direction of fluid flow has not changed but the current input velocity value exceeds the decayed previous output velocity value; and alternatively outputting the decayed previous output velocity value when the direction of fluid flow has changed but the magnitude of the current input velocity value does not exceed the velocity threshold value, or when the direction of fluid flow has not changed and the current input velocity value does not exceed the decayed previous output velocity value.

As an apparatus for providing persistence to ultrasound images, the apparatus receiving input velocity values and outputting output velocity values for an ultrasound image, an embodiment of the apparatus includes: a persistence determining unit that provides persistence to the output velocity value by outputting a decayed version of the output velocity value, or that avoids persistence and outputs the input velocity value, the persistence determining unit further detects when a change in flow direction has occurred, and when a change in the flow direction is detected avoids persistence and outputs the input velocity value; and a feedback mechanism for producing the decayed previous output value and supplying the decayed previous output value to the persistence determining unit.

As an ultrasound imaging system, an embodiment of the invention includes: a transducer for sending acoustical signals towards a subject, the acoustical signals being formed in accordance with electrical scan signals; a front end subsystem, operatively connected to the transducer, for producing the electrical scan signals based on scan parameters, for receiving echo signals from the subject in response to the acoustical signals, and for producing vector signals from the echo signals; a back end processing subsystem for receiving the vector signals from the front end subsystem and processing the vector signals to produce velocity values and then processing the velocity values to produce image data and parameter information, the back end processing subsystem including at least a persistence determining unit that provides persistence to the velocity values by outputting a decayed version of the velocity values, or that avoids persistence and outputs the velocity values, the persistence determining unit further detects when a change in flow direction has occurred, and when a change in the flow direction is detected avoids persistence and outputs the velocity value; and a display device for displaying an image in accordance with the image data.

The advantages of the invention are numerous. One advantage of the invention is that even though persistence is provided, the direction of the fluid flow follows the actual flow direction. Another advantage of the invention is that the corruption caused by flash artifacts and random noise is reduced while providing persistence to the image. Still another advantage of the invention is that the aliasing is better imaged so that the direction indicated by the image is more accurate of the actual direction. Yet another advantage of the invention is that the conventional averaging approach and its associated distortions and shortcomings are avoided.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention is an improved technique for providing persistence to velocity signals obtained by an ultrasound imaging system. The velocity signals with appropriate persistence are then used to form an image on a display device so as to accurately depict fluid flow. According to the invention, the persistence technique intelligently decides whether or not to provide persistence to the velocity signals. In making these persistence determinations, the persistence technique not only avoids distorting the velocity values with corrupt signals, but also preserves directional flow information. Additionally, the persistence technique can make use of various thresholds to reduce errors (e.g., flash artifacts or random noise) as well as persistence of such errors.

Embodiments of the invention are discussed below with reference to FIGS. 1–9. However, those skilled in the art will readily appreciate that the detailed description given herein with respect to these figures is for explanatory purposes as the invention extends beyond these limited embodiments.

Figure 1:
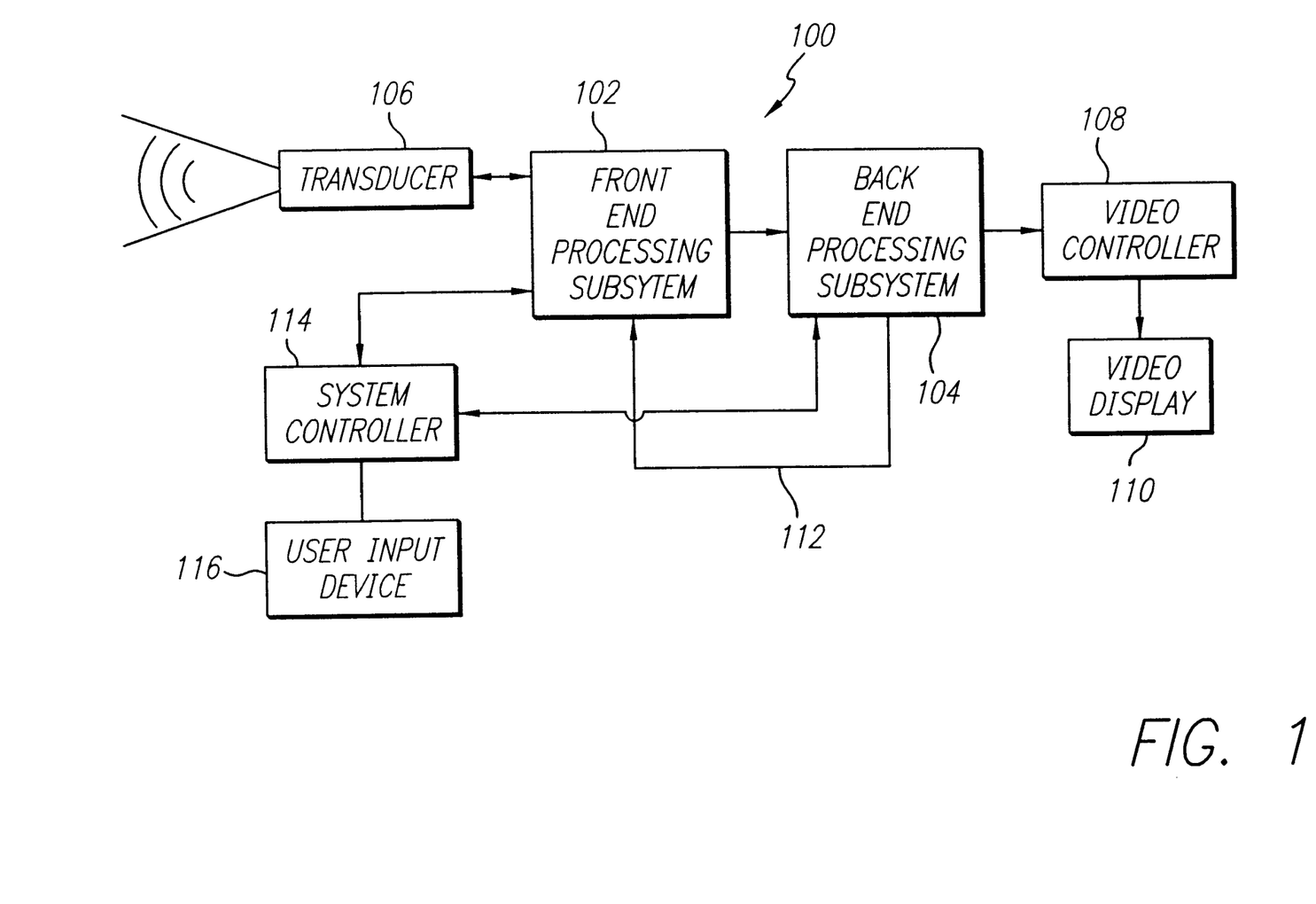
FIG. 1 is a block diagram of an ultrasound system for producing ultrasound images.

FIG. 1 is a block diagram of an ultrasound system 100 for producing ultrasound images. The ultrasound system 100 includes a front end processing subsystem 102 and a back end processing system 104. The front end processing subsystem 102 is coupled to a transducer 106. Normally, a transmitter as well as a receiver/beam-former within the front end processing subsystem 102 couple to the transducer 106 via a transmit/receive switch (not shown). The transducer 106 operates to generate and receive acoustic signals. The acoustic signals that are generated by the transducer 106 are directed towards a body region of a patient, and then reflected back to the transducer 106 as echo signals. The echo signals obtained by the transducer 106 are then forwarded to the front end processing subsystem 102. After some front end processing of the echo signals within the front end processing subsystem 102, vector data associated with the echo signals are produced by the front end processing and then supplied to the back end processing subsystem 104.

The back end processing subsystem 104 performs back end processing which includes, for example, echo signal processing, color flow processing, and Doppler processing. The echo signal processing is performed when the ultrasound system 100 is in an echo mode, the color flow processing is performed when the ultrasound system 100 is in a color flow mode, and the Doppler processing is performed when the ultrasound system 100 is in a Doppler mode.

The echo signal processing typically encompasses signal enhancement filtering, energy detection and image enhancement filtering. Various known filtering and convolution techniques are employed. The basic purpose of echo signal processing is to enhance the signal to noise ratio of the echo signal.

Flow signal processing analyzes signals for flow parameters. Typical parameter derivations include sample correlation and flow averaging. The purpose of flow signal processing is to identify flow and turbulence within a scanned area.

Doppler signal processing typically encompasses signal enhancement filtering, spectral estimation processing, energy detection, and derived waveform filtering. The purpose of Doppler signal processing is to identify and filter out Doppler shift, to improve spectral frequency response, and to coordinate spectral mapping.

The back end processing subsystem 104 may also include scan conversion processing, image processing and video processing.

Scan conversion processing converts the processed vector data streams from echo signal processing and flow signal processing. When the transducer 106 performs sector scanning, the vector signals are digital polar-coordinate data samples of echo, flow and/or Doppler signals. When the transducer 106 performs linear scanning, the vector signals are digital Cartesian-coordinate data samples of echo, flow and/or Doppler signals. For polar-coordinate vector data, the data is converted by the scan conversion processing into Cartesian-coordinate raster data. For Cartesian-coordinate vector data the data is scaled by the scan conversion processing into Cartesian-coordinate raster data.

Image processing includes image enhancement processes executed on the raster data or vector data. In an off-line delayed playback mode of operation image data, vector data and/or raster data is received from an image memory and processed. Image processing tasks for varying applications include, for example, histogram equalization, contrast limited adaptive histogram equalization, edge enhancement, boundary enhancement, 2-D graphics, 3-D volume visualization, tissue characterization, perfusion measurements, image segmentation, edge detection and speckle reduction.

Video processing executes on the image processed data to generate video signals, audio signals, and graphing signals for output to a display device, audio device, storage device (e.g., VCR) and/or charting device. Video processing in some applications also executes on Doppler processed vector data to generate similar video signals, audio signals, and graphing signals for output to the display device, audio device, storage device and/or charting device.

The end result of the back end processing is typically raster data that is used to display the ultrasound image. The raster data output from the back end processing subsystem 104 is then supplied to a video controller 108. The video controller 108 controls a video display 110 whereon the ultrasound image is displayed. The back end processing performed by the back end processing subsystem 104 may also determine and feedback parameter adjustment information to the front end processing subsystem 102 via a feedback bus 112. The feedback bus 112 is, more generally, a link. The feedback bus 112 provides a high speed connection between the back end processing subsystem 104 and the front end processing subsystem 102. The back end processing subsystem 104 and its interaction with the feedback bus 112 are discussed in detail in U.S. Pat. No. 5,704,209, which is hereby incorporated by reference.

The ultrasound system 100 also includes a system controller 114 and a user input device 116. The system controller 114 operates to initiate and to perform overall control of the ultrasound system 100. In controlling the ultrasound system 100, the system controller 114 sends and receives control signals to and from both the front end processing subsystem 102 and the back end processing subsystem 104. Examples of the specific control operations performed by the system controller 114 include, for example, the scheduling of very high level tasks. The user input device 116 is coupled to the system controller 114 for supplying user input thereto. The user input device 116 can, for example, be a keyboard, a pointing device, knobs, dials, and the like.

Figure 2:
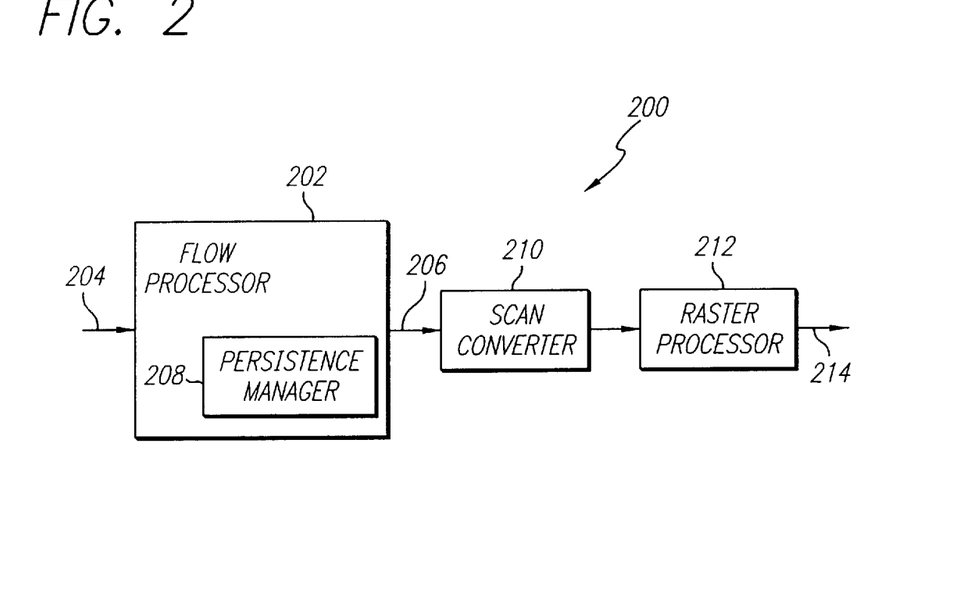
FIG. 2 is a block diagram of a color flow portion of a back end processing system.

FIG. 2 is a block diagram of a color flow portion 200 of a back end processing system. The color flow portion 200 of the back end processing system illustrated in FIG. 2 pertains to color flow processing and is representative of a portion of the back end processing system 104 illustrated in FIG. 1.

The color flow portion 200 of the back end processing subsystem includes a flow processor 202 that receives the vector data 204 from the front end processing subsystem 102 and outputs velocity signals 206. The flow processor 202 performs color flow processing when the ultrasound system 100 is in the color flow mode. In addition, the flow processor 202 includes a persistence manager 208. The function of the persistence manager 208 is to provide persistence to the velocity signals 206 being output from the flow processor 202 such that the resulting image of velocity flow being displayed on the video display 110 is improved over those images conventionally displayed. Generally speaking, the persistence manager 208 operates to intelligently decide whether or not to provide persistence to the velocity signals 206 being output from the flow processor 202. In making these persistence determinations, the persistence manager 208 not only avoids conventional averaging approaches that distort the velocity values, but also preserves directional flow information. Additionally, the persistence manager 208 may make use of various thresholds to reduce errors (e.g., flash artifacts or random noise) as well as their persistence. Additional details on the persistence manager 208 and its operations are discussed in detail below.

Normally, the velocity signals 206 are produced frame-by-frame. Each of the velocity signals 206 corresponding to a pixel in the image at a given time period associated with a frame. To support real-time imaging, the frames must be processed in rapid succession of one another.

The velocity signals 206 that are output from the flow processor 202 are supplied to a scan converter 210. The scan conversion processing performed by the scan converter 210 converts the velocity signals 206 to Cartesian-coordinate samples as necessary depending on the type of scan performed. Then, a raster processor 212 converts the Cartesian-coordinate samples output from the scan converter 210 into raster data 214. The raster data 214 is then supplied to the video controller 108 and then the video display 110 where an image indicating velocity of flows is displayed.

The persistence manager 208 can be implemented by discrete circuitry, a custom integrated circuit, an Application Specific Integrated Circuit (ASIC), a Programmable Logic Array (PLA), or other discrete electronics or semiconductor products. Although the processing of the persistence manager 208 could be performed in software, preferably, the implementation is a hardware implementation (e.g., PLA) because very fast throughput is needed for real-time imaging.

Figure 3:
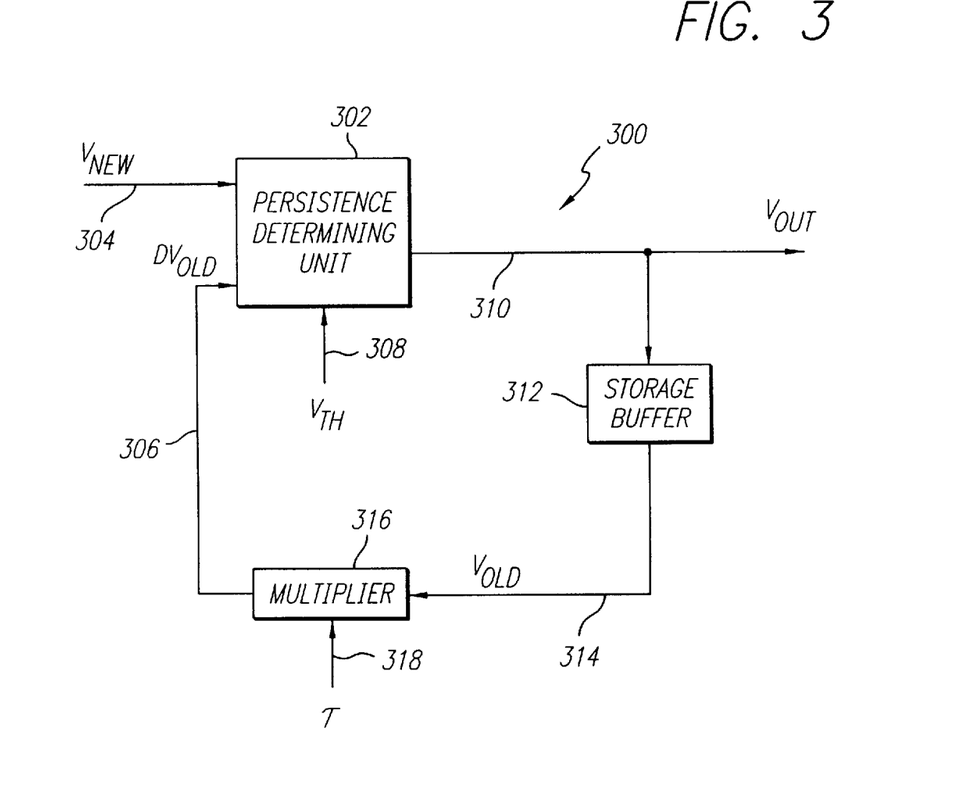
FIG. 3 is a block diagram of a persistence manager according to a first embodiment of the invention.

FIG. 3 is a block diagram of a persistence manager 300 according to a first embodiment of the invention. The persistence manager 300 includes a persistence determining unit 302 that receives a new velocity value ($V_{NEW}$) 304 from the flow processor 202. The persistence determining unit 302 also receives a decayed previous velocity value ($dV_{OLD}$) 306 and a velocity threshold value 308. Based on these inputs, the persistence determining unit 302 produces an output velocity value ($V_{OUT}$) 310. The output velocity value ($V_{OUT}$) 310 represents a velocity for a portion (e.g., pixel) of a frame and is one of the velocity signals 206 supplied to the scan converter 210. The operation of the persistence determining unit 302 in producing the output velocity value ($V_{OUT}$) 310 is discussed in detail below with reference to FIG. 4.

The output velocity value ($V_{OUT}$) 310 is also stored to a storage buffer 312. The storage buffer 312 provides a temporary storage location for the output velocity value ($V_{OUT}$) 310 such that the output velocity value ($V_{OUT}$) 310 may be later used when determining the next output velocity value. In determining the next output velocity value, the output velocity value ($V_{OUT}$) 310 stored in the storage buffer 312 is retrieved from the storage buffer 312 as a previous velocity value ($V_{OLD}$) 314. A multiplier 316 then multiplies the previous velocity value ($V_{OLD}$) 314 with a decay factor (τ) 318 to produce a decayed previous velocity value ($dV_{OLD}$) 306. The decayed previous velocity value ($dV_{OLD}$) 306 is then supplied to the persistence determining unit 308 as previously noted.

Figure 4:
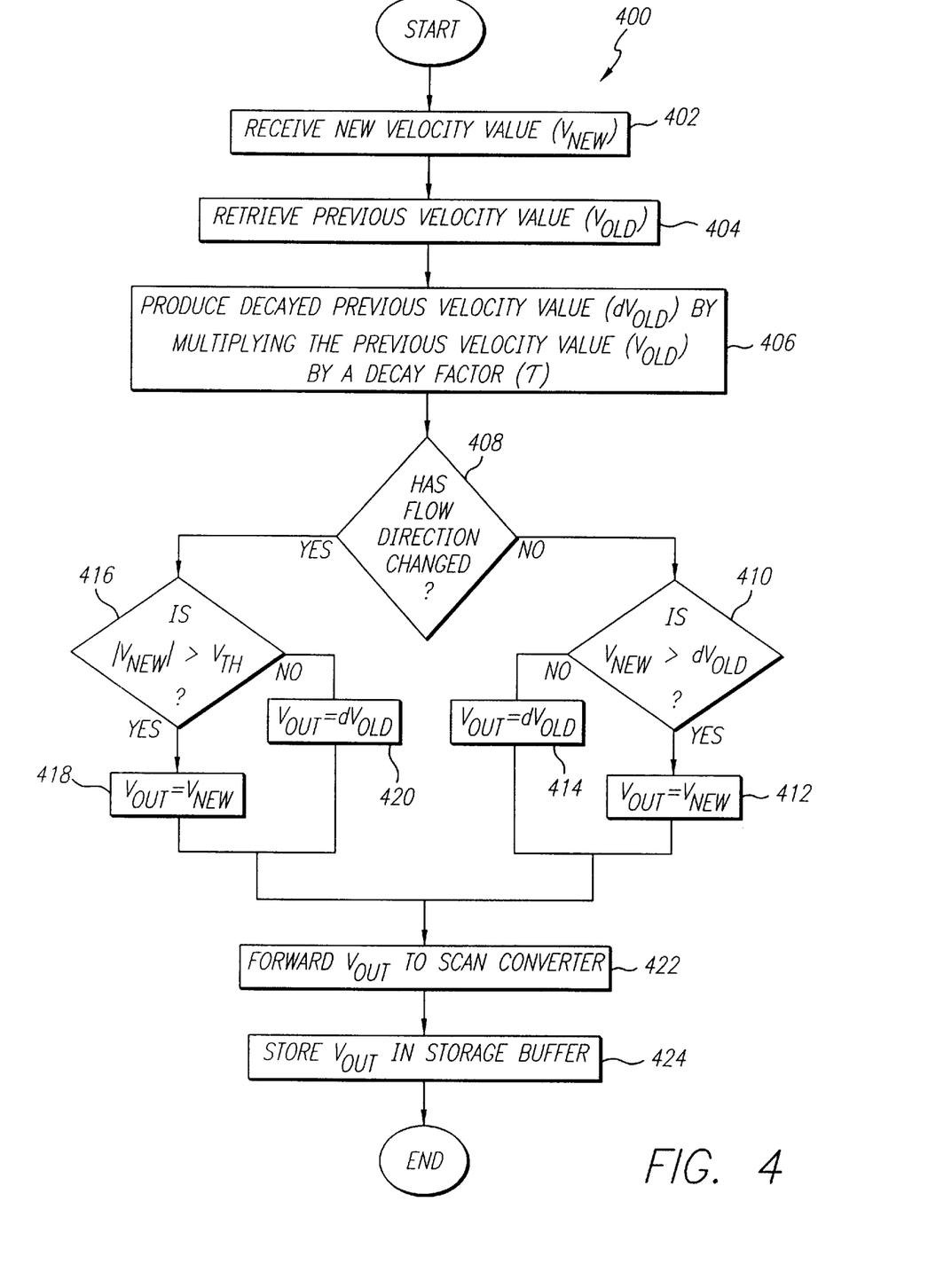
FIG. 4 is a flow diagram of persistence processing according to an embodiment of the invention.

FIG. 4 is a flow diagram of persistence processing 400 according to an embodiment of the invention. The persistence processing 400 is, for example, performed by the persistence manager 300 illustrated in FIG. 3 in producing an output velocity value ($V_{OUT}$) 310. Hence, although not limited to the persistence manager 300, the persistence processing 400 is described with reference to the persistence manager 300 for ease of understanding.

The persistence processing 400 initially receives 402 a new velocity value ($V_{NEW}$) and retrieves 404 the previous velocity value ($V_{OLD}$). The new velocity value ($V_{NEW}$) is received 402 from the flow processor 202, and the previous velocity value ($V_{OLD}$) is retrieved 404 from the storage buffer 312. Preferably, the storage buffer 312 stores an entire frame of previous velocity values. In such case, the retrieval 402 of the previous velocity value ($V_{OLD}$) retrieves the appropriate one of the stored values from the storage buffer 312.

Next, a decayed previous velocity value ($dV_{OLD}$) is produced 406 by multiplying the previous velocity value ($V_{OLD}$) by a decay factor (τ) (406). As a result, the absolute value of the previous velocity value ($V_{OLD}$) is decreased. The decay factor (τ) is a value less than one that is user selectable. For example, through the user input device 116 a user of the ultrasound system 100 is able to set a persistence level, and in doing so a decay factor (τ) is chosen by the ultrasound system 100 in accordance with the chosen persistence level. The greater the persistence desired, the closer the decay factor (τ) gets to one.

A decision block 408 then determines whether the flow direction has changed. More particularly, the decision block 408 determines whether the direction of flow associated with the new velocity value ($V_{NEW}$) is different than the direction associated with the previous velocity value ($V_{OLD}$) (or the decayed previous velocity value ($dV_{OLD}$). In one embodiment, the velocity values are signed values with the sign indicating direction of the velocity with respect to the transducer 106, and the signed values are represented in 2's complement notation such that the first bit indicates its sign (i.e., positive or negative).

In the case in which the decision block 408 determines that the flow direction has not changed, a decision block 410 compares the new velocity value ($V_{NEW}$) with the decayed previous velocity value ($dV_{OLD}$). When the new velocity value ($V_{NEW}$) is greater than the decayed previous velocity value ($dV_{OLD}$), the output velocity value ($V_{OUT}$) is set 412 to the new velocity value ($V_{NEW}$). On the other hand, when the new velocity value ($V_{NEW}$) is not greater than a decayed previous velocity value ($dV_{OLD}$), then the output velocity value ($V_{OUT}$) is set 414 to the decayed previous velocity value ($dV_{OLD}$). Here, as long as the flow direction has not changed and the velocity values (in absolute value terms) are decreasing in velocity, the persistence provided by the decayed previous velocity value ($dV_{OLD}$) is utilized and output to give a particular portion (e.g., pixel) now being processed persistence. However, even though the flow direction has not changed, the persistence is not provided when the velocity values are increasing in velocity. This combination of output velocity values ($V_{OUT}$) advantageously track increasing velocity values with minimal distortion to image high velocity features, while decreasing velocity values are decayed down with the persistence to yield images that facilitate diagnosis and reduce confusion.

Alternatively, when the decision block 408 determines that there has been a change in flow direction, a decision block 416 compares the absolute value of the new velocity value ($|V_{NEW}|$) with a velocity threshold value ($V_{TH}$). When the absolute value of the new velocity value ($|V_{NEW}|$) is greater than the velocity threshold value ($V_{TH}$), the output velocity value ($V_{OUT}$) is set 418 to the new velocity value ($V_{NEW}$). On the other hand, when the absolute value of the new velocity value ($|V_{NEW}|$) is not greater than the velocity threshold value ($V_{TH}$), the output velocity value ($V_{OUT}$) is set 420 to the decayed previous velocity value ($dV_{OLD}$). Here, when the flow direction has changed, the persistence is not provided when the new velocity value ($V_{NEW}$) is legitimate. In this embodiment, the new velocity value ($V_{NEW}$) is legitimate when the absolute value of the new velocity value ($|V_{NEW}|$) is greater than the velocity threshold value ($V_{TH}$). In other words, since flash artifacts typically have a velocity value that is small, the velocity threshold value ($V_{TH}$) is able to successfully detect and ignore flash artifacts. The output velocity value ($V_{OUT}$) is thus able to preserve directional information and as result the resulting image being displayed is more accurate of actual flow. On the other hand, if the new velocity value ($V_{NEW}$) is determined to not be legitimate, then persistence is provided by ignoring the new velocity value ($V_{NEW}$).

Following any of the assignment blocks 412, 414, 418 and 420, the persistence processing 400 continues by forwarding 422 the output velocity value ($V_{OUT}$) to the scan converter 210. Also, the output velocity value ($V_{OUT}$) is stored 424 in the storage buffer 312 for subsequent use. Following block 424, the persistence processing 400 is complete and ends.

Figure 5:
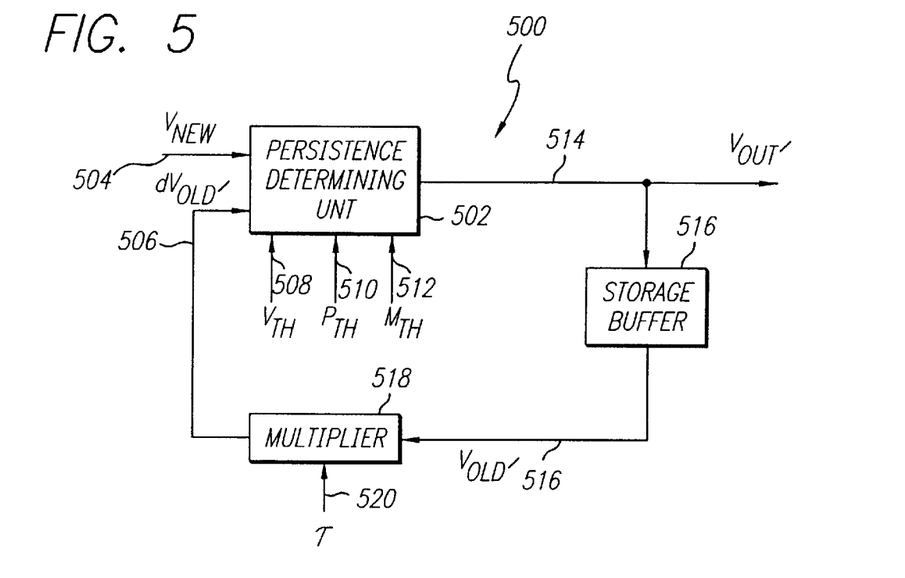
FIG. 5 is a block diagram of a persistence manager according to a second embodiment of the invention.

FIG. 5 is a block diagram of a persistence manager 500 according to a second embodiment of the invention. The persistence manager 500 operates much like the persistence manager 300 does, except some additional processing is performed to further improve the resulting image.

The persistence manager 500 includes a persistence determining unit 502 that receives a new velocity value ($V_{NEW}$) 504 and a decayed previous velocity value ($dV_{OLD}'$) 506. In addition, the persistence determining unit 502 also receives a variety of threshold values. Specifically, the persistence determining unit 502 receives a velocity threshold value ($V_{TH}$) 508, a power threshold value ($P_{TH}$) 510 and a magnitude threshold value ($M_{TH}$) 512. The persistence determining unit 502 outputs an output velocity value ($V_{OUT}'$) 514 which is supplied to the scan converter 210 and eventually the video display 110. The output velocity value ($V_{OUT}'$) 514 is also stored to a storage buffer 516 for later retrieval. To produce the decayed previous velocity value ($dV_{OLD}'$) 506, the persistence manager 500 utilizes the corresponding value stored in the storage buffer 516 which is retrieved as a previous velocity output value ($V_{OLD}'$) 516 and supplied to a multiplier 518. The multiplier 518 then multiplies the previous velocity value ($V_{OLD}'$) by a decay factor ($\tau$) 520 to produce the decayed previous velocity value ($dV_{OLD}'$) 506.

The operation of the persistence determining unit 502 is largely the same as the persistence determining unit 302 illustrated in FIG. 3 and described with reference to FIG. 4. However, the persistence determining unit 502 performs additional operations associated with the additional threshold values provided thereto. The additional processing performed by the persistence determining unit 502 over that of the persistence determining unit 302 is illustrated in FIG. 6.

Figure 6:
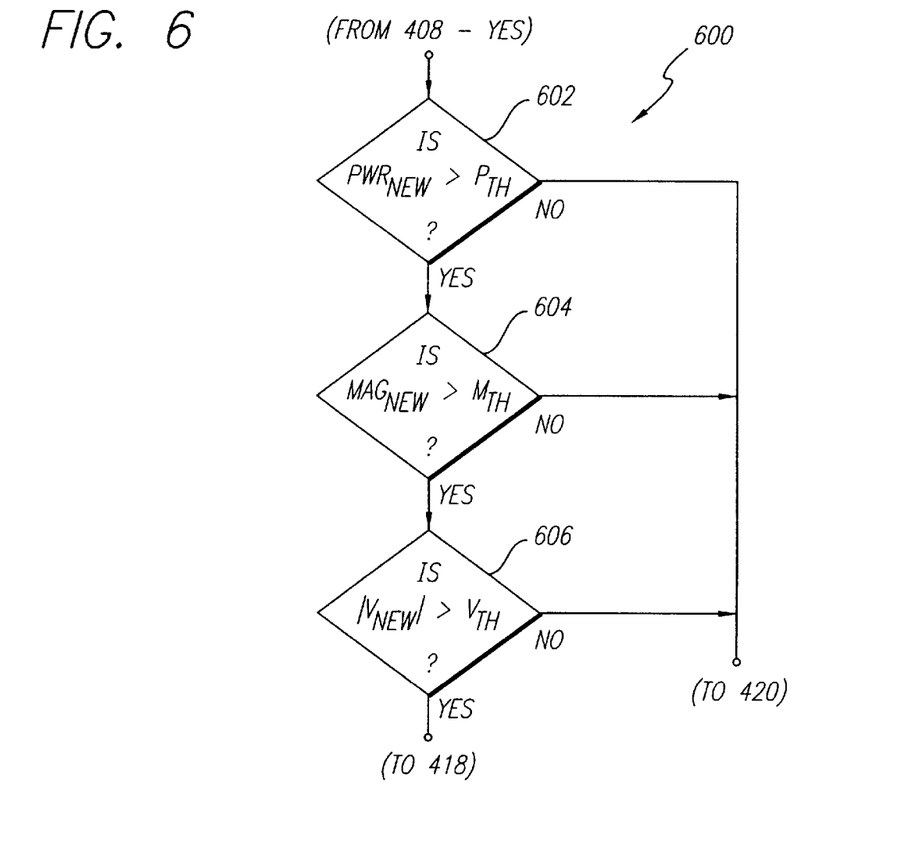
FIG. 6 is a flow diagram of additional persistence processing performed by the persistence manager illustrated in FIG. 5.

FIG. 6 is a flow diagram of additional persistence processing 600 performed by the persistence manager 500 illustrated in FIG. 5. The additional persistence processing 600 operates to replace the decision block 416 in FIG. 4 with multiple decision blocks. Specifically, the additional persistence processing 600 includes a first decision block 602 that determines whether the power associated with the new velocity value ($V_{NEW}$) is greater than the power threshold value ($P_{TH}$). If the power associated with the new velocity value ($V_{NEW}$) is greater than the power threshold value ($P_{TH}$), then the incoming signal is deemed to be acceptable and likely not associated with random noise. A second decision block 604 determines whether the magnitude of the signal associated with the new velocity value ($V_{NEW}$) is greater than the magnitude threshold value ($M_{TH}$). If the magnitude associated with the new velocity value ($V_{NEW}$) is greater than the magnitude threshold value ($M_{TH}$), then the incoming signal being received is also deemed to be acceptable and not associated with random noise or other undesirable effects. A third decision block 606 determines whether the absolute value of the new velocity value ($|V_{NEW}|$) is greater than the velocity threshold value ($V_{TH}$). The third decision block 606 is the same as the decision block 416 in FIG. 4.

The additional persistence processing 600 causes the output velocity value ($V_{OUT}'$) 514 to be set 420 to the decayed previous velocity value ($dV_{OLD}'$) if any of the thresholds are not met. On the other hand, if all of the thresholds are met by the power, magnitude and velocity of the incoming signal from the transducer 106, then the incoming signal is deemed to be appropriate velocity signal and the output velocity value ($V_{OUT}'$) is set to the new velocity value ($V_{NEW}'$) since there has been a change in flow direction. As a result, the persistence is normally not provided in this case. However, the persistence is provided only when the incoming signals do not exceed each of the various threshold values. In other words, persistence with respect to the previous velocity value ($V_{OLD}'$) is provided because the new velocity values ($V_{NEW}'$) are deemed to be undesired signals such as associated with flash artifacts and random noise.

As is conventional in ultrasound systems, the velocity values are obtained from the phase of a first lag autocorrelation of the color flow signals, the magnitude values are obtained from the magnitude of a first lag autocorrelation of the color flow signals, and the power values are obtained from a zero lag autocorrelation of the color flow signals.

Figure 7:
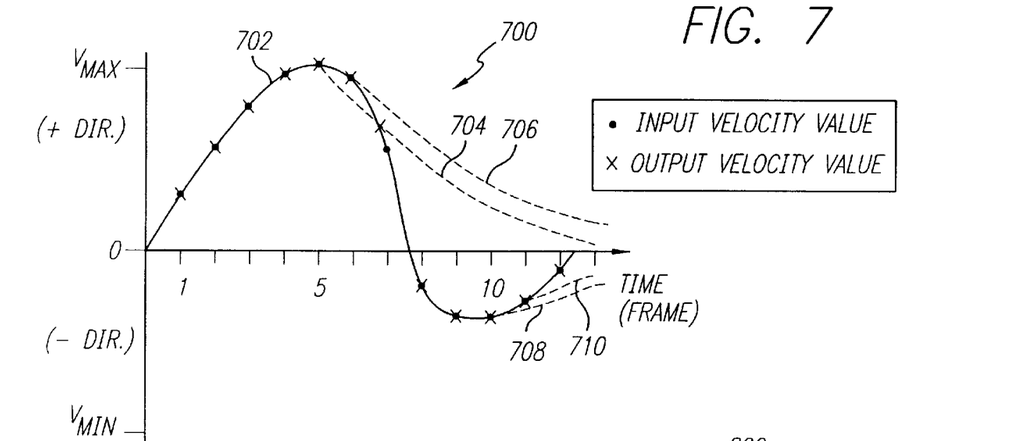
FIGS. 7, 8 and 9 are charts illustrating operation and advantages of the persistence technique according to the invention.
Figure 8:
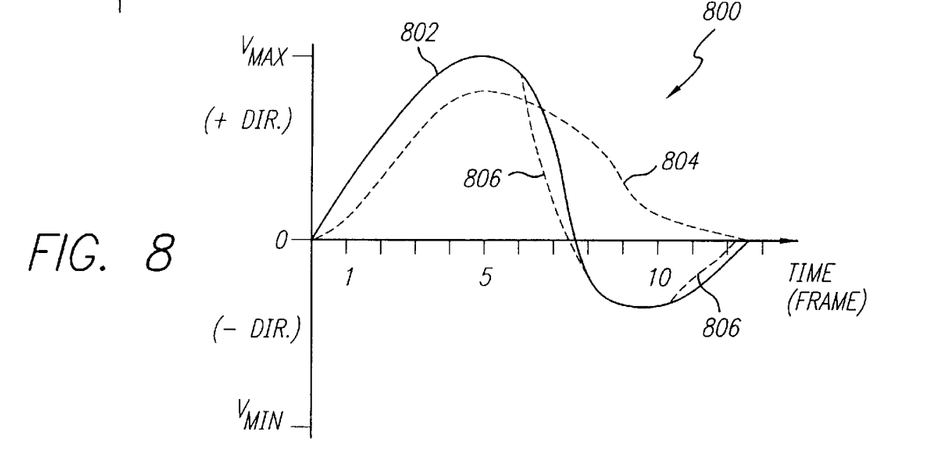
Figure 9:
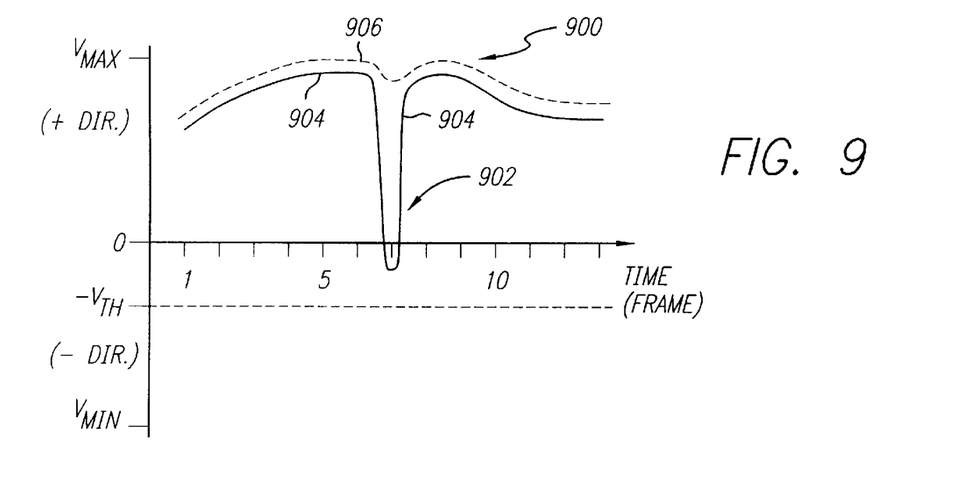

The operation and advantages of the persistence technique according to the invention is further illustrated with FIGS. 7–9.

FIG. 7 is a chart 700 illustrating the operation of the invention on a representative cardiac curve 702. The cardiac curve 702 is an example of one of many possible velocity curves obtained by an ultrasound system. The cardiac curve 702 consists of input velocity values for each frame, with each of the velocity values being indicated by "•". The cardiac curve 700 is illustrated over thirteen frames. The output velocity values produced by the persistence technique according to the invention are indicated by "X". The curves 704, 706, 708 and 710 are decay curves for each of the output velocity values at frames 5, 6, 10 and 11, respectively. Note the that output velocity values follow the input velocity values while increasing (frames 1–5, 9 and 10), but that while the input velocity values are decreasing the output velocity value follows (i) the input velocity when greater than a decayed previous value (frame 6), (ii) a decayed previous value when greater than the input velocity value for the same direction (frames 7, 11 and 12), or (iii) the input velocity value when the flow direction changes) (frame 8).

FIG. 8 is a chart 800 illustrating the beneficial operation of the persistence technique according to the invention over conventional averaging approaches with respect to the cardiac curve 700 illustrated in FIG. 7. The chart 800 illustrates the output velocity curve 802 as produced by the invention. In contrast, a conventional output velocity curve 804 is also illustrated. Note that the conventional output velocity curve 804 does not track the cardiac curve 700 nearly as well as does the output velocity curve 802 of the invention. Notice that the in region corresponding to frames 1–6 of the conventional output velocity curve 804, the velocity is somewhat suppressed. Some of the recent averaging approaches have corrected for this suppression to achieve the performance much like the invention does in this region. However, with respect to the region corresponding to frames 8–11, the invention offers superior operation even compared to the recent averaging approaches. Specifically, the output velocity curve 802 according to the invention follows the direction of the flow at frame 8 as it reverses direction. On the other hand, the conventional output velocity curve 804 is distorted and erroneously reports the flow direction in frames 8–12. Note also that persistence is intelligently provided at frames 7, 11 and 12. Thus, deviations 806 between the cardiac curve 700 and the output velocity curve 802 provided by the invention occur where persistence is provided, otherwise, the cardiac curve 700 is closely tracked.

In the case where the input velocity curve has an aliased portion, the invention is also able to closely track the input velocity curve as the flow direction rapidly changes at the beginning and end of the aliased portion.

FIG. 9 is a chart 900 illustrating the beneficial operation of the persistence technique according to the invention when presented with an artifact 902 in an input velocity curve 904. An output velocity curve 906 is also illustrated. The artifact 902 is present at frame 7 of the input velocity curve 904. Because the absolute value of the input velocity curve 904 at frame 7 is smaller than the threshold level ($V_{TH}$), the value of the input velocity curve 904 at frame 7 is ignored and the output velocity curve 906 uses a decayed version of the value of the output velocity curve 906 at frame 6 as the output velocity value at frame 7. Typically, the threshold level ($V_{TH}$) (e.g., the velocity threshold value 308, 508) is on the order of 1–10% of the maximum output velocity. Thus, the artifact 902 is detected and ignored such that the output velocity curve 906 is essentially not distorted by the presence of the artifact 902 in the input velocity curve 904.

The advantages of the invention are numerous. One advantage of the invention is that even though persistence is provided, the direction of the fluid flow follows the actual flow direction. Another advantage of the invention is that the corruption caused by flash artifacts and random noise is reduced while providing persistence to the image. Still another advantage of the invention is that the aliasing is better imaged so that the direction indicated by the image is more accurate of the actual direction. Yet another advantage of the invention is that the conventional averaging approach and its associated distortions and shortcomings are avoided.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for displaying color flow images, said method comprising:
    (a) obtaining a current input velocity value for flow in a portion of an image to be displayed;
    (b) obtaining a previous output velocity value for flow in the portion of the image to be displayed;
    (c) decreasing the absolute value of the previous output velocity by a decay factor to produce a decayed previous output velocity value;
    (d) determining whether the direction of flow associated with the current input velocity value is substantially opposite the direction of flow associated with the previous output velocity value;
    (e) comparing the current input velocity value with the decayed previous output velocity value; and
    (f) outputting the current input velocity value when one of the direction of fluid flow has changed and the current input velocity value exceeds the decayed previous output velocity value; otherwise, outputting the decayed previous output velocity value.

2. A method as recited in claim 1, wherein the portion of the image is a pixel.

3. A method as recited in claim 1, wherein the image to be displayed is produced by a frame of pixel values, and the determining of each pixel value is performed by repeating operations (a)–(f).

4. A method as recited in claim 1, wherein when the decayed previous output velocity value is output as an output velocity value for the portion of the image, then the portion of the image is provided with persistence.

5. A method as recited in claim 1, wherein the decay factor is user selectable such that the user is able to adjust a level of the persistence provided.

6. A method for displaying color flow images, said method comprising:
    (a) obtaining a current input velocity value for flow in a portion of an image to be displayed;
    (b) obtaining a previous output velocity value for flow in the portion of the image to be displayed;
    (c) decreasing the absolute value of the previous output velocity by a decay factor to produce a decayed previous output velocity value;
    (d) determining whether the direction of flow associated with the current input velocity value is substantially opposite the direction of flow associated with the previous output velocity value;
    (e) comparing the current input velocity value with the decayed previous output velocity value;
    (f) comparing the magnitude of the current input velocity value with a velocity threshold value;
    (g) outputting the current input velocity value when the direction of fluid flow has changed and the magnitude of the current input velocity value exceeds the velocity threshold value, or when the direction of fluid flow has not changed but the current input velocity value exceeds the decayed previous output velocity value; and
    (h) alternatively outputting the decayed previous output velocity value when the direction of fluid flow has changed but the magnitude of the current input velocity value does not exceed the velocity threshold value, or when the direction of fluid flow has not changed and the current input velocity value does not exceed the decayed previous output velocity value.

7. A method as recited in claim 6, wherein said outputting operation (h) provides persistence to the portion of the image, and said outputting operation (g) avoids persistence to the portion of the image.

8. A method as recited in claim 7,
    wherein said comparing (f) operates to identify artifacts or noise on the current input velocity value, and
    wherein said outputting (h) operates to ignore the change in direction flow and maintain the persistence of the decayed previous output velocity value so as to reduce errors due to artifacts or noise.

9. A method as recited in claim 6,
    wherein said method further comprises:
       (i) comparing the power level of the current input velocity value with a power threshold value,
    wherein said outputting (g) outputs the current input velocity value when the direction of fluid flow has changed and the absolute value of the current input velocity value exceeds the velocity threshold value and the power of the current input velocity value exceeds the power threshold value, or when the direction of fluid flow has not changed but the current input velocity value exceeds the decayed previous output velocity value, and
    wherein said outputting (h) alternatively outputs the decayed previous output velocity value when the direction of fluid flow has changed but at least one of the absolute value of the current input velocity value does not exceed the velocity threshold value and the power of the current input velocity value does not exceeds the power threshold value, or when the direction of fluid flow has not changed and the current input velocity value does not exceed the decayed previous output velocity value.

10. A method as recited in claim 6,
wherein said method further comprises:
(i) comparing the magnitude level of the current input velocity value with a magnitude threshold value,
wherein said outputting (g) outputs the current input velocity value when the direction of fluid flow has changed and the absolute value of the current input velocity value exceeds the velocity threshold value and the magnitude of the current input velocity value exceeds the magnitude threshold value, or when the direction of fluid flow has not changed but the current input velocity value exceeds the decayed previous output velocity value, and
wherein said outputting (h) alternatively outputs the decayed previous output velocity value when the direction of fluid flow has changed but at least one of the absolute value of the current input velocity value does not exceed the velocity threshold value and the magnitude of the current input velocity value does not exceeds the magnitude threshold value, or when the direction of fluid flow has not changed and the current input velocity value does not exceed the decayed previous output velocity value.

11. A method as recited in claim 6,
wherein said method further comprises:
(i) comparing the power level of the current input velocity value with a power threshold value; and
(j) comparing the magnitude level of the current input velocity value with a magnitude threshold value,
wherein said outputting (g) outputs the current input velocity value when the direction of fluid flow has changed and the absolute value of the current input velocity value exceeds the velocity threshold value and the power and magnitude of the current input velocity value respectively exceed the power and magnitude threshold values, or when the direction of fluid flow has not changed but the current input velocity value exceeds the decayed previous output velocity value, and
wherein said outputting (h) alternatively outputs the decayed previous output velocity value when the direction of fluid flow has changed but at least one of the absolute value of the current input velocity value does not exceed the velocity threshold value and the power and magnitude of the current input velocity value do not respectively exceeds the power and magnitude threshold values, or when the direction of fluid flow has not changed and the current input velocity value does not exceed the decayed previous output velocity value.

12. An apparatus for providing persistence to ultrasound images, said apparatus receives input velocity values and outputs output velocity values for an ultrasound image, said apparatus comprising:
a persistence determining unit that provides persistence to the output velocity value by outputting a decayed version of the output velocity value, said persistence determining unit further compares the input velocity value with the decayed version of the output velocity value and detects when a change in flow direction has occurred, and when a change in the flow direction is detected or when the input velocity value exceeds the decayed version of the output velocity value said persistence determining unit avoids persistence and outputs the input velocity value instead of the decayed version of the output velocity value; and
a feedback mechanism for producing the decayed version of the output velocity value and supplying the decayed version of the output velocity value to said persistence determining unit.

13. An apparatus for providing persistence to ultrasound images, said apparatus receives input velocity values and outputs output velocity values for an ultrasound image said apparatus comprising:
a persistence determining unit that provides persistence to the output velocity value by outputting a decayed version of the output velocity value, said persistence determining unit further detects when a change in flow direction has occurred, and when a change in the flow direction is detected avoids persistence and outputs the input velocity value instead of the decayed version of the output velocity value; and
a feedback mechanism for producing the decayed version of the output velocity value and supplying the decayed version of the output velocity value to said persistence determining unit,
wherein said persistence determining unit further receives a threshold value, and wherein when a change in the flow direction is detected, said persistence determining unit avoids persistence and outputs the input velocity value, provided a predetermined aspect of the input velocity value exceeds the threshold value; otherwise, when a change in flow direction is detected but the predetermined aspect of the input velocity value does not exceed the threshold value, said persistence determining unit provides persistence and outputs the decayed version of the output velocity value.

14. An ultrasound imaging system, comprising:
a transducer for sending acoustical signals towards a subject, the acoustical signals being formed in accordance with electrical scan signals;
a front end subsystem, operatively connected to said transducer, for producing the electrical scan signals based on scan parameters, for receiving echo signals from the subject in response to the acoustical signals, and for producing vector signals from the echo signals;
a back end processing subsystem for receiving the vector signals from said front end subsystem and processing the vector signals to produce velocity values and then processing the velocity values to produce image data and parameter information, said back end processing subsystem including at least a persistence determining unit that provides persistence to the velocity values by outputting a decayed version of the velocity values, said persistence determining unit further compares the input velocity value with the decayed version of the output velocity value and detects when a change in flow direction has occurred, and when a change in the flow direction is detected or when the input velocity value exceeds the decayed version of the output velocity value, said persistence determining unit avoids persistence and outputs the velocity value instead of the decayed version of the output velocity value; and
a display device for displaying an image in accordance with the image data.

15. An ultrasound imaging system, comprising:
a transducer for sending acoustical signals towards a subject, the acoustical signals being formed in accordance with electrical scan signals;
a front end subsystem, operatively connected to said transducer, for producing the electrical scan signals based on scan parameters, for receiving echo signals from the subject in response to the acoustical signals, and for producing vector signals from the echo signals;

a back end processing subsystem for receiving the vector signals from said front end subsystem and processing the vector signals to produce velocity values and then processing the velocity values to produce image data and parameter information, said back end processing subsystem including at least a persistence determining unit that provides persistence to the velocity values by outputting a decayed version of the velocity values, said persistence determining unit further detects when a change in flow direction has occurred, and when a change in the flow direction is detected avoids persistence and outputs the velocity value instead of the decayed version of the output velocity value; and a display device for displaying an image in accordance with the image data, wherein said persistence determining unit further receives a threshold value, and wherein when a change in the flow direction is detected, said persistence determining unit avoids persistence and outputs the velocity value, provided a predetermined aspect of the velocity value exceeds the threshold value; otherwise, when a change in flow direction is detected but the predetermined aspect of input velocity value does not exceed the threshold value, said persistence determining unit provides persistence and outputs the decayed version of the velocity value.

16. An ultrasound imaging system as recited in claim 15, wherein the image is a color flow image produced by color Doppler imaging.

17. An apparatus for displaying color flow images, said apparatus comprising:

means for obtaining a current input velocity value for flow in a portion of an image to be displayed;

means for obtaining a previous output velocity value for flow in the portion of the image to be displayed;

means for decreasing the absolute value of the previous output velocity by a decay factor to produce a decayed previous output velocity value;

means for determining whether the direction of flow associated with the current input velocity value is substantially opposite the direction of flow associated with the previous output velocity value;

means for comparing the current input velocity value with the decayed previous output velocity value; and means for outputting the current input velocity value when one of the direction of fluid flow has changed and the current input velocity value exceeds the decayed previous output velocity value; otherwise, outputting the decayed previous output velocity value.

18. A method as recited in claim 17, wherein the portion of the image is a pixel, wherein the image to be displayed is produced by a frame of pixel values, and wherein when the decayed previous output velocity value is output as an output velocity value for the portion of the image, then the portion of the image is provided with persistence.

19. An apparatus for displaying color flow images, said method comprising:

means for obtaining a current input velocity value for flow in a portion of an image to be displayed;

means for obtaining a previous output velocity value for flow in the portion of the image to be displayed;

means for decreasing the absolute value of the previous output velocity by a decay factor to produce a decayed previous output velocity value;

means for determining whether the direction of flow associated with the current input velocity value is substantially opposite the direction of flow associated with the previous output velocity value;

means for comparing the current input velocity value with the decayed previous output velocity value;

means for comparing the magnitude of the current input velocity value with a velocity threshold value;

means for outputting the current input velocity value when the direction of fluid flow has changed and the magnitude of the current input velocity value exceeds the velocity threshold value, or when the direction of fluid flow has not changed but the current input velocity value exceeds the decayed previous output velocity value; and means for alternatively outputting the decayed previous output velocity value when the direction of fluid flow has changed but the magnitude of the current input velocity value does not exceed the velocity threshold value, or when the direction of fluid flow has not changed and the current input velocity value does not exceed the decayed previous output velocity value.

* * * * *